(12) United States Patent
Ke et al.

(10) Patent No.: US 10,161,792 B2
(45) Date of Patent: Dec. 25, 2018

(54) DEVICE AND METHOD FOR REALIZING SPECTRAL POLARIZATION-INDEPENDENT MEASUREMENT BASED ON FREQUENCY DOMAIN DEPOLARIZATION STRUCTURE

(71) Applicant: HUAZHONG UNIVERSITY OF SCIENCE AND TECHNOLOGY, Wuhan, Hubei (CN)

(72) Inventors: Changjian Ke, Hubei (CN); Deming Liu, Hubei (CN); Chen Xing, Hubei (CN); Ke Zhang, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 15/526,933

(22) PCT Filed: Aug. 22, 2016

(86) PCT No.: PCT/CN2016/096154
§ 371 (c)(1),
(2) Date: May 15, 2017

(87) PCT Pub. No.: WO2018/010255
PCT Pub. Date: Jan. 18, 2018

(65) Prior Publication Data
US 2018/0245976 A1     Aug. 30, 2018

(30) Foreign Application Priority Data
Jul. 13, 2016   (CN) .......................... 2016 1 0548916

(51) Int. Cl.
*G01J 3/02*     (2006.01)
*G01J 3/44*     (2006.01)
(Continued)

(52) U.S. Cl.
CPC ........... *G01J 3/0224* (2013.01); *G01J 3/0218* (2013.01); *G01J 3/44* (2013.01); *G01J 3/447* (2013.01);
(Continued)

(58) Field of Classification Search
CPC ........ G01J 3/0224; G01J 3/0218; G01J 3/447; G02B 6/2706; G02B 6/2786; G02B 6/2746
See application file for complete search history.

(56) References Cited

U.S. PATENT DOCUMENTS 6,384,916 B1 * 5/2002 Furtak ..................... G01J 3/447
356/369
2003/0016425 A1 * 1/2003 Tan ..................... G02B 6/2706
398/204
(Continued)

FOREIGN PATENT DOCUMENTS

CN     102706451     10/2012
CN     103940513      7/2014

OTHER PUBLICATIONS

S. Diaz et al., "A High-Performance Optical Time-Domain Brillouin Distributed Fiber Sensor," IEEE Sensors Journal, vol. 8, No. 7 (2008), p. 1268-1272.
(Continued)

*Primary Examiner* — Dominic J Bologna
(74) *Attorney, Agent, or Firm* — Hamre, Schumann, Mueller & Larson, P.C.

(57) ABSTRACT

The present invention discloses a device and a method for realizing spectral polarization-independent measurement based on a frequency domain depolarization structure. The device comprises a pump light source module, a depolarization module, an SBS effect generation module and a data acquisition and spectrum reconstruction module. The method comprises: emitting laser light having a fixed polar-
(Continued)

ization state from the pump light source module; the laser light from an output end of the pump light source module passing through the depolarization module to become depolarized light; inputting the depolarized light as pump light into the SBS effect generation module to interact with signal light under test input from the outside into the SBS effect generation module; and after amplifying the signal light under test through the SBS effect generation module, performing data acquisition processing through the data acquisition and spectral reconstruction module and finally obtaining a spectrum of a signal under test. The present invention can eliminate the problems that the acquired spectral information is not accurate, the power measurement is not stable and the like when a spectral measurement device based on an SBS effect measures an input signal light having arbitrary polarization state, and has an important application prospect.

6 Claims, 4 Drawing Sheets

(51) Int. Cl.
*G02B 6/27* (2006.01)
*G01J 3/447* (2006.01)

(52) U.S. Cl.
CPC ............ *G02B 6/27* (2013.01); *G02B 6/2706* (2013.01); *G02B 6/2786* (2013.01); *G02B 6/2746* (2013.01)

(56) References Cited

U.S. PATENT DOCUMENTS

| | | | |
|---|---|---|---|
| 2004/0008918 A1* | 1/2004 | Azami | G02B 6/274 385/11 |
| 2005/0018189 A1* | 1/2005 | Hampton | G01J 3/447 356/369 |
| 2005/0264813 A1* | 12/2005 | Giakos | B82Y 20/00 356/369 |
| 2010/0245819 A1* | 9/2010 | Li | G01B 11/0641 356/327 |

OTHER PUBLICATIONS

J. Liu et al., "Low-DOP Depolarizer for Linearly Polarized Light Independent of Direction of Vibration," Acta Optica Sinica, vol. 27, No. 3 (2007), p. 536-539.

S. Preussler et al., "Enhancement of spectral resolution and optical rejection ration of Brillouin optical spectral analysis using polarization pulling," Optics Express, vol. 20, No. 13 (2012), 12 pages.

\* cited by examiner

Fig. 7

DEVICE AND METHOD FOR REALIZING SPECTRAL POLARIZATION-INDEPENDENT MEASUREMENT BASED ON FREQUENCY DOMAIN DEPOLARIZATION STRUCTURE

TECHNICAL FIELD

The present invention belongs to the technical field of spectrum measurement and in particular relates to a device and a method for realizing spectral polarization-independent measurement based on a frequency domain depolarization structure.

BACKGROUND

Spectrum measurement devices have important application in fields such as optical fiber communication, optical fiber sensing and substance analysis. A volume grating-based spectrum measurement uses a spatial dispersion effect of the volume grating to realize separation of different frequency components of the signal light, thereby completing the measurement of the spectrum of the signal light and the extraction of spectral information. Due to the limitation of factors such as preparation process and device size of the volume grating, the resolution of this type of spectrum measurement device can only reach a magnitude of 1 GHz at present. Since gain bandwidth based on stimulated Brillouin scattering (SBS) effect in an optical fiber is very narrow (at a magnitude of 10 MHz), the SBS effect can equivalently function as a narrowband optical filter which is used for extracting fine spectral components. In combination with a tunable laser, a spectrum measurement device having a resolution at a magnitude of 10 MHz can be formed and has a wide application prospect in the above-mentioned fields.

However, the frequency response of the narrowband optical filter based on the SBS effect changes obviously depending on matching or mismatching of the polarization states of the signal light and the pump light, which results in that the spectrum measurement device based on this effect presents polarization dependence when measuring a signal under test. In other words, with the change of the polarization state of the signal light, the spectrum measured by the device is poor in repeatability and the values of power spectral density corresponding to different frequencies are not stable. As described in the paper (Preussler S, Zadok A, Wiatrek A, et al., Enhancement of spectral resolution and optical rejection ratio of Brillouin optical spectral analysis using polarization pulling.[J]. Optics Express, 2012, 20(13): 14734-45), a plurality of polarization controllers are used to realize the matching of the polarization states of the pump light and the signal light, so as to achieve the optimal spectral measurement result. However, when the polarization state of the signal is changed, an accurate spectrum measurement result can only be obtained by adjusting the polarization controllers again. This type of spectral polarization-dependent measurement device based on SBS effect lacks for practical value.

SUMMARY

Aiming at overcoming the defects of the prior art, the present invention provides a device and a method for realizing spectral polarization-independent measurement based on a frequency domain depolarization structure, so as to solve the problems that the acquired spectral information is not accurate, the power measurement is not stable and the like when a conventional spectrum measurement device based on SBS effect measures an input optical signal having arbitrary polarization state.

The present invention provides a depolarization module, comprising an optical power distribution unit, a delay unit, a polarization control unit and an optical power coupling unit with adjustable distribution ratio, wherein:

an input end of the optical power distribution unit is an input end of the depolarization module, and two output ends of the optical power distribution unit are respectively connected to input ends of the delay unit and the polarization control unit; output ends of the delay unit and the polarization control unit are respectively connected to two input ends of the optical power coupling unit with adjustable distribution ratio; and an output end of the optical power coupling unit with adjustable distribution ratio is an output end of the depolarization module.

Further, the optical power coupling unit with adjustable distribution ratio consists of an attenuator(s) and an optical coupler which are connected in series, has two input ends and one output end and is used for coupling two beams of input light into one beam of output light; the attenuator is arranged at one optical coupling input end or two attenuators are respectively arranged at the two input ends; and the attenuator(s) plays a role of enabling optical power of two laser light beams to be equal before entering the optical coupler.

Further, the polarization control unit is set to enable the polarization state of output laser light adjusted by the polarization control unit to be orthogonal with the polarization state of a second beam of laser light, and specifically a following matrix is satisfied:

$$(S_{20}, S_{21}, S_{22}, S_{23})^T = (S_{10}, -S_{11}, S_{12}, -S_{13})^T$$

wherein, $S_{10}$, $S_{11}$, $S_{12}$ and $S_{13}$ are four Stokes parameters corresponding to the second beam of laser light, $(S_{10}, S_{11}, S_{12}, S_{13})^T$ represents the polarization state of the second beam of laser light, $(S_{20}, S_{21}, S_{22}, S_{23})^T$ represents the polarization state of the beam of laser light adjusted through the polarization control unit, and $S_{20}$, $S_{21}$, $S_{22}$, $S_{23}$ are four Stokes parameters corresponding to the beam of laser light.

Based on the depolarization module, the present invention provides a device for spectral polarization-independent measurement, further comprising a pump light source module and an SBS effect generation module, wherein an output end of the pump light source module is connected to an input end of the depolarization module; two input ends of the SBS effect generation module are respectively connected to an output end of the depolarization module and an external to-be-measured signal light; and a delay unit in the depolarization module consists of an optical fiber and is used for enabling two laser light beams to be time-independent, and a minimum value of length L of the optical fiber satisfies $$\exp\left(-\frac{2\pi\Delta\lambda n}{\lambda^2}L\right) \leq 0.01,$$

wherein $\Delta\lambda$ is line width of a pump light source, n is a refraction index of optical fiber, and $\lambda$ is working wavelength of the pump light source; and a maximum value of the length L of the optical fiber satisfies $$\frac{\upsilon L}{c} \leq \frac{\Delta}{2},$$

wherein υ represents scanning speed of the pump light source in a scanning working state, Δ represents resolution of the spectrum measurement device and c represents speed of light in the optical fiber.

Further, the pump light source module in the device for spectral polarization-independent measurement comprises a tunable laser unit and a polarization stabilizing unit; an input end of the polarization stabilizing unit is connected to an output end of the tunable laser unit; and an output end of the polarization stabilizing unit is the output end of the pump light source module.

Further, the device for spectral polarization-independent measurement also comprises a data acquisition and spectrum reconstruction module, an input end of the data acquisition and spectrum reconstruction module is connected to an output end of an SBS effect generation module and the data acquisition and spectrum reconstruction module is used for completing photoelectric conversion, signal acquisition, data processing and spectrum reconstruction.

Correspondingly, the present invention further provides a method for realizing spectral polarization-independent measurement based on a frequency domain depolarization structure, characterized in that the method comprises the following steps:

(1) transmitting laser light, in a scanning working state, emitted by a tunable laser unit into a depolarization module after polarization stabilization is performed;

(2) in the depolarization module, dividing the to-be-depolarized laser light into two beams by means of an optical power distribution unit, a first beam of laser light passing through a delay unit by which the first beam of laser light is delayed to enable the first beam of laser light and a second beam of laser light to be time-independent; the second beam of laser light passing through a polarization control unit by which a polarization state of the second beam of laser light is adjusted to be orthogonal with a polarization state of the first beam of laser light; coupling the two laser light beams by an optical power coupling unit with adjustable distribution ratio, and adjusting an attenuator(s) to enable the two laser light beams to be coupled in equal power manner to obtain depolarized light;

(3) inputting the depolarized light output from the depolarization module as pump light into the SBS effect generation module in which signal light under test interacts with the depolarized light and is filtered and amplified; and (4) using a data acquisition and spectrum reconstruction module to detect and acquire the signal light under test amplified by the SBS effect generation module to realize correction and conversion from an electric signal to an optical signal to complete spectrum reconstruction.

In general, through the technical solution conceived by the present invention, as compared with the prior art, by using the depolarization module to depolarize the laser light output by the pump light source module, the frequency response of the SBS effect generation module which is equal to a filter does not change along with the matching or mismatching of the polarization states of the signal light and the pump light. Thus, the spectrum measurement device based on the SBS effect can measure an input signal light having arbitrary polarization state, and the acquired spectral information is accurate and the power measurement is stable.

In all drawings, the same reference signs are used for representing the same components or structures, wherein:
1—pump light source module, 2—depolarization module, 3—SBS effect generation module, 4—data acquisition and spectrum reconstruction module, 5—tunable laser unit, 6—polarization stabilizing unit, 7—optical power distribution unit, 8—delay unit, 9—polarization control unit, 10—optical power coupling unit with adjustable distribution ratio, 11—circulator unit, 12—SBS effect generation unit, 13—photoelectric detection unit, 14—data acquisition unit, 15—spectrum reconstruction unit, 16—tunable laser, 17—polarization stabilizer, 18—1:1 beam splitter, 19—polarization controller, 20—delay fiber, 21—variable optical attenuator, 22—1:1 beam combiner, 23—circulator, 24—highly nonlinear fiber, 25—isolator, 26—photoelectric detector, 27—data acquisition card, 28—computer, 29—signal light source.

DETAIL DESCRIPTION OF THE EMBODIMENTS

In order to enable the purpose, the technical solution and the advantages of the present invention to be clearer, the present invention will be further described below in detail in combination with the drawings and the embodiments. It should be understood that the specific embodiments described here are just used for explaining the present invention instead of limiting the present invention.

Aiming at the defects or improvement demands of the prior art, the present invention provides a device and a method for realizing spectral polarization-independent measurement based on a frequency domain depolarization structure, so as to solve the problems that the acquired spectral information is not accurate, the power measurement is not stable and the like when a conventional spectrum measurement device based on an SBS effect measures an input optical signal having arbitrary polarization state.

In order to realize the purpose, in one aspect, the present invention provides a device for realizing spectral polarization-independent measurement based on a frequency domain depolarization structure. The device specifically comprises a pump light source module 1, a depolarization module 2, an SBS effect generation module 3 and a data acquisition and spectrum reconstruction module 4.

Figure 1:
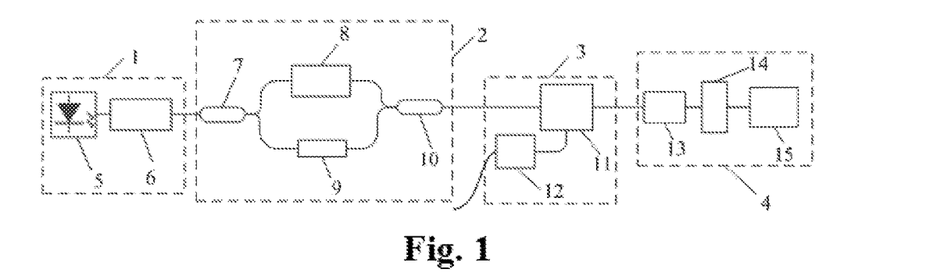
FIG. 1 illustrates a schematic diagram of a device for realizing spectral polarization-independent measurement based on a frequency domain depolarization structure.

As illustrated in FIG. 1, the device provided by the present invention comprises the pump light source module 1 which consists of a tunable laser unit 5 and a polarization stabilizing unit 6; the depolarization module 2 which consists of an optical power distribution unit 7, a delay unit 8, a polarization control unit 9 and an optical power coupling unit with adjustable distribution ratio 10; the SBS effect generation module 3 which consists of a circulator unit 11 and an SBS effect generation unit 12; and the data acquisition and spectrum reconstruction module 4 which consists of a photoelectric detection unit 13, a data acquisition unit 14 and a spectrum reconstruction unit 15.

Figure 2:
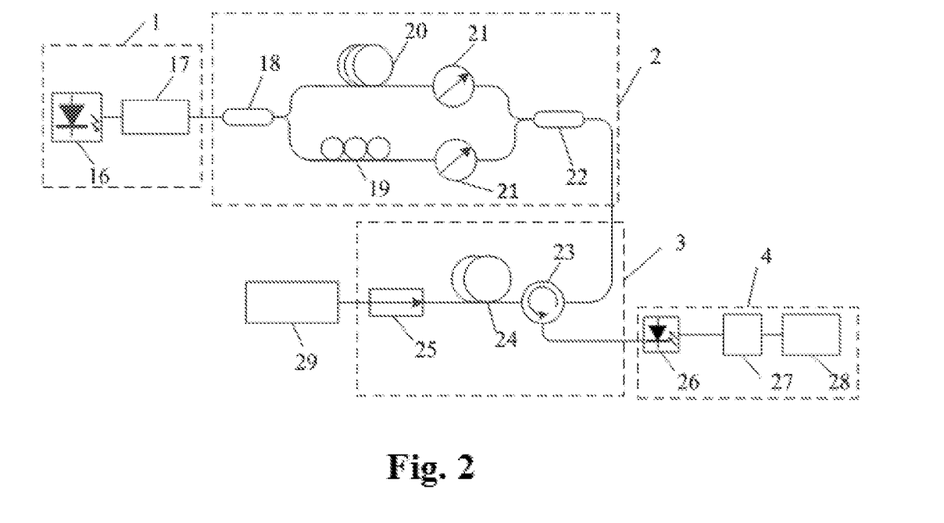
FIG. 2 illustrates a structural schematic diagram of a device for realizing spectral polarization-independent measurement based on a frequency domain depolarization structure according to an embodiment.

As illustrated in FIG. 2, an exemplary device for realizing spectral polarization-independent measurement based on the frequency domain depolarization structure comprises a tunable laser 16, a polarization stabilizer 17, a 1:1 beam splitter 18, a polarization controller 19, a delay fiber 20, variable optical attenuators 21, a 1:1 beam combiner 22, a circulator 23, a highly nonlinear fiber 24, an isolator 25, a photoelectric detector 26, a data acquisition card 27, a computer 28 and a signal light source 29.

The pump light source module consists of the tunable laser 16 and the polarization stabilizer 17; an output end of the tunable laser 16 is connected to an input end of the polarization stabilizer 17, here the polarization stabilizer may be used as the polarization stabilizing unit and a polarizer may also be simply used; and an output end of the polarization stabilizer 17 is used as an output end of the pump light source module 1.

The depolarization module 2 consists of the 1:1 beam splitter 18, the polarization controller 19, the delay fiber 20, the variable optical attenuators 21 and the 1:1 beam combiner 22; an input end of the 1:1 beam splitter 18 is used as an input end of the depolarization module 2 and is connected to the output end of the pump light source module 1; two output ends of the 1:1 beam splitter 18 are respectively connected to an input end of the delay fiber 20 and an input end of the polarization controller 19; an output end of the delay fiber 20 and an output end of the polarization controller 19 are respectively connected to input ends of the two variable optical attenuators 21; output ends of the two variable optical attenuators 21 are respectively connected to two input ends of the 1:1 beam combiner 22; and an output end of the 1:1 beam combiner 22 is used as an output end of the depolarization module 2.

The SBS effect generation module 3 consists of the circulator 23, the highly nonlinear fiber 24 and the isolator 25; a first port of the circulator 23 is used as one input end of the SBS effect generation module 3 and is connected to the output end of the depolarization module 2; an input end of the isolator 25 is used as the other input end of the SBS effect generation module 3 and is connected to the signal light source 29; an output end of the isolator 25 is connected to one end of the highly nonlinear fiber 24; the other end of the highly nonlinear fiber 24 is connected to a second port of the circulator 23; and a third port of the circulator 23 is used as the output end of the SBS effect generation module 3.

The data acquisition and spectral reconstruction module 4 consists of the photoelectric detector 26, the data acquisition card 27 and the computer 28; an input end of the photoelectric detector 26 is used as an input end of the data acquisition and spectral reconstruction module 4 and is connected to the output end of the SBS effect generation module 3 to perform photoelectric conversion; an input end of the data acquisition card 27 is connected to an output end of the photoelectric detector 26 to perform data acquisition; and an input end of the computer 28 is connected to an output end of the data acquisition card 27 to perform data processing and spectral reconstruction.

In another aspect, the present invention further provides a method for realizing spectral polarization-independent measurement based on a frequency domain depolarization structure. The process comprises:

(1) connecting a polarization stabilizer behind a tunable laser and stabilizing a polarization state of laser light to be in a fixed state by the polarization stabilizer;

(2) splitting the laser light which passes through the polarization stabilizer into two beams by a 1:1 beam splitter, a first beam of laser light passing through a delay fiber by which the first beam of laser light is delayed to enable the first beam of laser light and a second beam of laser light to be time-independent; the second beam of laser light passing through a polarization controller by which a polarization state of the second beam of laser light is adjusted to be orthogonal with a polarization state of the first beam of laser light; respectively adjusting optical power of the two laser light beams by the variable optical attenuators thereof to enable the optical power of the two laser light beams to be equal; and combining the two laser light beams by using a beam combiner to obtain depolarized light;

(3) inputting the obtained depolarized light as pump light into the SBS effect generation module in which signal light under test interacts with the depolarized light and is filtered and amplified; and (4) after the signals under test is amplified by the SBS effect generation module, converting the signals under test into an electric signal through a photoelectric detector, performing data acquisition by a data acquisition card, performing data processing and spectrum reconstruction by a computer to obtain a spectrum of the signals under test.

In the embodiment of the present invention, since it is difficult to stimulate SBS effect if line width of the pump light is too wide and the delay fiber is too long if line width of the pump light is too narrow, laser light with line width of 100 kHz is selected to be used as pump light, and when the pump light is in a scanning working state, scanning speed is 5 nm/s.

In the embodiment of the present invention, the length of the delay fiber is jointly decided according to the requirements on the line width of the pump light source, the scanning speed and the resolution of the spectrum measurement device. In one aspect, in order to reduce the polarization degree of the pump light, line width 100 kHz and wavelength 1550 nm of the pump light are substituted into a formula $$\exp\left(-\frac{2\pi\Delta\lambda n}{\lambda^2}L\right) \leq 0.01$$

to calculate to find that the length of the delay fiber needs to be greater than 1500 m and the depolarization effect is better when the length of the optical fiber is greater; and in another aspect, the scanning speed of the pump light source is 5 nm/s, the resolution of the spectral measurement device is approximately 10 MHz, according to formula $$\frac{vL}{c} \leq \frac{\Delta}{2},$$

it can be seen that the resolution of the spectrum measurement device is not caused to be degraded when the optical fiber with length of 1500 m is selected, and when the length of the optical fiber is too great, e.g., when it exceeds 5000 m, the resolution of the spectral measurement device is caused to be obviously degraded.

In the embodiment of the present invention, construction of the SBS effect generation unit has been a mature technology and thus is not repetitively described here.

In the embodiment of the present invention, construction of the data acquisition and spectrum reconstruction module, noise reduction processing of data realized by means of software programming, correction and conversion from electric signal data to optical signal data and final spectrum reconstruction can be very easily realized by one skilled in the art, and thus are not repetitively described here.

The embodiment makes a comparison with the existing polarization-dependent spectral measurement device in combination with the drawings, and the present invention is further described through verification tests. In the verification tests of the present invention, a signal light source is polarized light, line width is at a magnitude of hundreds of kHz and a polarization degree is 1.

Figure 3:
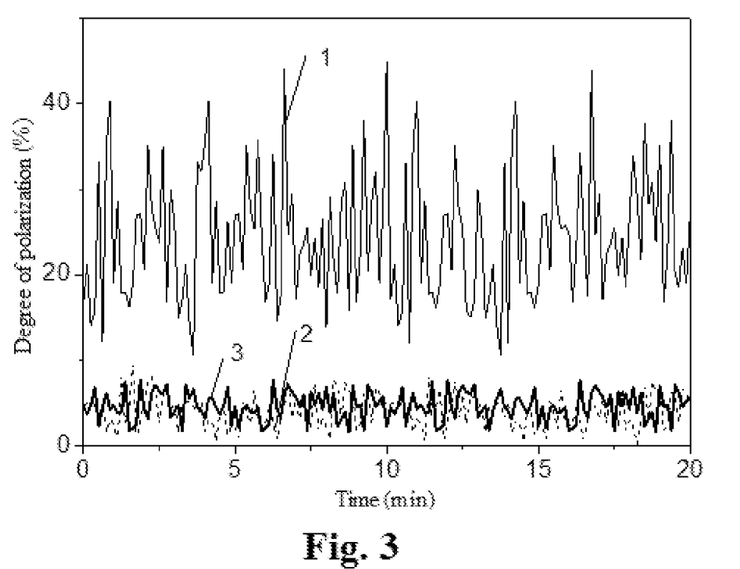
FIG. 3 illustrates polarization degree of depolarized pump light output by a depolarization module when lengths of delay fibers are different by adopting an exemplary embodiment illustrated in FIG. 2.

Refer to FIG. 3 which illustrates polarization degree of depolarized pump light output by a depolarization module by adopting an exemplary embodiment illustrated in FIG. 2 when lengths of delay fibers are different. Curve 1 represents change of polarization degree of the depolarized pump light with time when the length of the delay fiber is 500 m, curve 2 represents change of polarization degree of the depolarized pump light with time when the length of the delay fiber is 1500 m, and curve 3 represents change of polarization degree of the depolarized pump light with time when the length of the delay fiber is 5000 m. It verifies that, in the exemplary embodiment illustrated in FIG. 2, when the length of the delay fiber is not enough, the depolarization module cannot thoroughly depolarize the laser light, and when the length of the delay fiber is enough (≥1500 m), the polarization degree of the depolarized pump light is not obviously decreased with the increase of the length of the delay fiber any longer.

Figure 4:
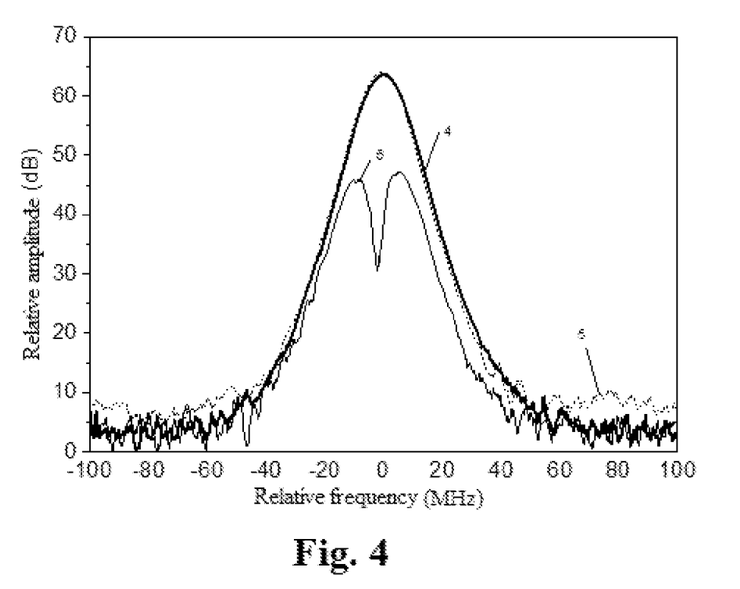
FIG. 4 illustrates comparison between frequency responses of an SBS effect generation module by adopting depolarized pump light and undepolarized pump light for signals under test having different polarization states.

Refer to FIG. 4 which illustrates comparison between frequency responses of an SBS effect generation module by adopting depolarized pump light and undepolarized pump light for signals under test having different polarization states. Curve 4 represents frequency response of the SBS effect generation module obtained by adopting the undepolarized pump light when the polarization state of the signal light under test matches the polarization state of the pump light, curve 6 represents frequency response of the SBS effect generation module obtained by adopting the undepolarized pump light when the polarization state of the signal light under test does not match the polarization state of the pump light, curve 5 represents frequency responses of the SBS effect generation module obtained by adopting the depolarized pump light under two situations that the polarization state of the signal light under test matches and does not match the polarization state of the pump light, and the frequency responses under the two situations are overlapped to form one curve. It verifies that the SBS effect generation module in the exemplary embodiment illustrated in FIG. 2 realizes polarization independence.

Figure 5:
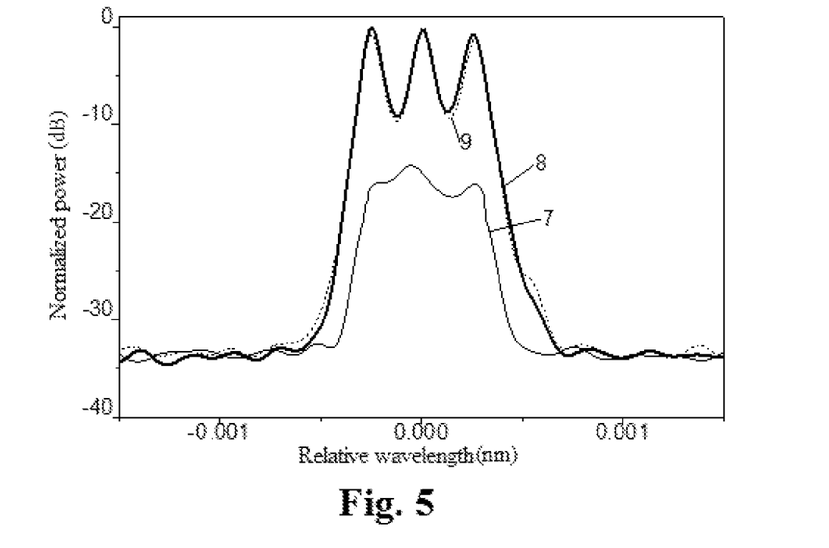
FIG. 5 illustrates comparison between spectrums measured by adopting an exemplary embodiment illustrated in FIG. 2 and a spectral polarization-dependent measurement device based on an SBS effect for signals under test having different polarization states.

Refer to FIG. 5 which illustrates comparison between spectrums measured by adopting an exemplary embodiment illustrated in FIG. 2 and a spectral polarization-dependent measurement device based on an SBS effect for signals under test having different polarization states. Curve 9 represents a spectrum of the signal light under test measured when the polarization state of the signal light under test matches the polarization state of the pump light, wherein the measured spectrum is optimum; curve 7 represents a spectrum of the signal light under test measured when the polarization state of the signal light under test does not match the polarization state of the pump light, wherein the power density of the measured spectrum is smaller than the power density of the actual spectrum and signal spectrum details are lost; curve 8 represents a spectrum measured by the spectrum measurement device illustrated in FIG. 2 for signals under test having different polarization states, wherein spectrums of the signals under test having different polarization states are overlapped and have the same effect as the optimum spectrum obtained by the spectral polarization-dependent measurement device. It verifies that the spectrum measurement device illustrated in FIG. 2 can measure the spectrums of the signals having arbitrary polarization state.

Figure 6:
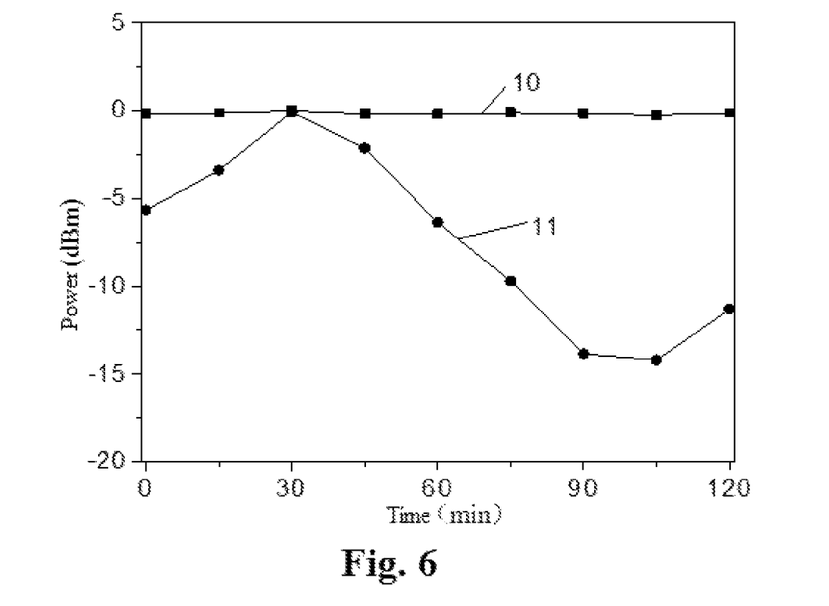
FIG. 6 illustrates comparison between long-term stabilities of power obtained by adopting an exemplary embodiment illustrated in FIG. 2 and a spectral polarization-dependent measurement device based on SBS effect for a same signals under test.

Refer to FIG. 6 which illustrates comparison between long-term stabilities of power obtained by adopting an exemplary embodiment illustrated in FIG. 2 and a spectral polarization-dependent measurement device based on an SBS effect for a same signal under test. Curve 11 represents measurement results of the spectral polarization-dependent measurement device based on the SBS effect, wherein since the polarization state of the signal light is changed in long-term measurement process and does not match the polarization state of the pump light any longer, consequently the optical power measurement is not accurate and the long-term measurement results fluctuate greatly, and the fluctuation amplitude is greater than 15 dB; and curve 10 represents measurement results of the spectrum measurement device illustrated in FIG. 2, wherein since measurement can be performed to signals having arbitrary polarization state, the long-term measurement results fluctuate slightly and the fluctuation amplitude is smaller than 1 dB. It proves that the measurement stability of the spectrum measurement device illustrated in FIG. 2 is improved relative to the spectral polarization-dependent measurement device.

Figure 7:
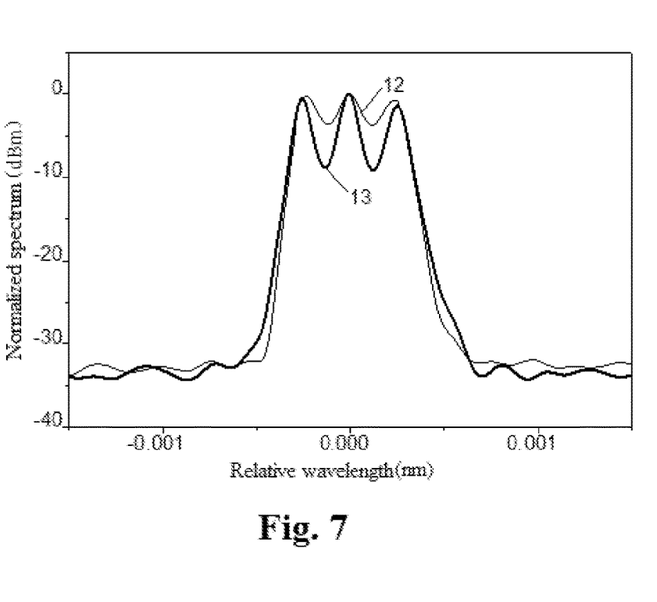
FIG. 7 illustrates comparison between spectrums measured by adopting an exemplary embodiment illustrated in FIG. 2 for a same signals under test when lengths of delay fibers are different.

Refer to FIG. 7 which illustrates comparison between spectrums measured by adopting an exemplary embodiment illustrated in FIG. 2 for a same signals under test when lengths of delay fibers are different. Curve 12 represents a spectrum measured by adopting the exemplary embodiment illustrated in FIG. 2 when the length of the delay fiber in the depolarization module is 5000 m; and curve 13 represents a spectrum measured by adopting the exemplary embodiment illustrated in FIG. 2 when the length of the delay fiber in the depolarization module is 1500 m. It verifies that the resolution of the spectrum measurement device is influenced when the length of the delay fiber is too great and the resolution is lower when the delay fiber is longer. In combination with FIG. 3, it proves that the selection of the delay fiber is jointly restricted by the line width of the pump light, the scanning speed when the pump light is in the scanning working state and the resolution of the spectrum measurement device.

To sum up, by adopting the present invention, the problems that the acquired spectral information is not accurate, the power measurement is not stable and the like when the conventional spectral measurement device based on the SBS effect measures the input optical signal having arbitrary polarization state can be solved, and the depolarization-independent measurement of the spectrum measurement device based on the SBS effect is realized.

One skilled in the art can easily understand that the embodiments described above are just preferred embodiments of the present invention and are not used for limiting the present invention. Any modification, equivalent replacement, improvement and the like made within the spirit and principle of the present invention shall be all included in the protection scope of the present invention.

The invention claimed is:

1. A device for spectral polarization-independent measurement, comprising:
    a depolarization module, the depolarization module comprising an optical power distribution unit, a delay unit, a polarization control unit and an optical power coupling unit with adjustable distribution ratio, wherein:
    an input end of the optical power distribution unit is an input end of the depolarization module, and two output ends of the optical power distribution unit are respectively connected to input ends of the delay unit and the polarization control unit output ends of the delay unit and the polarization control unit are respectively connected to two input ends of the optical power coupling unit with adjustable distribution ratio; and an output end of the optical power coupling unit with adjustable distribution ratio is an output end of the depolarization module,
    a pump light source module and a stimulated Brillouin scattering (SBS) effect generation module, wherein, an output end of the pump light source module is connected to the input end of the depolarization module; two input ends of the SBS effect generation module are respectively connected to the output end of the depolarization module and an external signal light under test; and
    the delay unit in the depolarization module consists of an optical fiber and is configured for enabling two laser light beams to be time-independent, and a minimum value of a length L of the optical fiber satisfies $$\exp\left(-\frac{2\pi\Delta\lambda n}{\lambda^2}L\right) \le 0.01,$$

wherein $\Delta\lambda$ is a line width of the pump light source, n is a refraction index of the optical fiber, and $\lambda$ is a working wavelength of the pump light source; and a maximum value of the length L of the optical fiber satisfies $$\frac{\upsilon L}{c} \le \frac{\Delta}{2},$$

wherein $\upsilon$ represents a scanning speed when the pump light source is in a scanning working state, $\Delta$ represents a resolution of a spectrum measurement device, and c represents a speed of light in the optical fiber.

2. The device according to claim 1, wherein the pump light source module comprises a tunable laser unit and a polarization stabilizing unit; an input end of the polarization stabilizing unit is connected to an output end of the tunable laser unit; and an output end of the polarization stabilizing unit is the output end of the pump light source module.

3. The device according to claim 2, wherein the device further comprises a data acquisition and spectrum reconstruction module, an input end of the data acquisition and spectrum reconstruction module is connected to an output end of the SBS effect generation module, and the data acquisition and spectrum reconstruction module is configured for achieving photoelectric conversion, signal acquisition, data processing, and spectrum reconstruction.

4. The device according to claim 1, wherein the device further comprises a data acquisition and spectrum reconstruction module, an input end of the data acquisition and spectrum reconstruction module is connected to an output end of the SBS effect generation module, and the data acquisition and spectrum reconstruction module is configured for achieving photoelectric conversion, signal acquisition, data processing, and spectrum reconstruction.

5. A device for spectral polarization-independent measurement, comprising:
    a depolarization module, the depolarization module comprising an optical power distribution unit, a delay unit, a polarization control unit and an optical power coupling unit with adjustable distribution ratio, wherein:
    an input end of the optical power distribution unit is an input end of the depolarization module, and two output ends of the optical power distribution unit are respectively connected to input ends of the delay unit and the polarization control unit output ends of the delay unit and the polarization control unit are respectively connected to two input ends of the optical power coupling unit with adjustable distribution ratio; and an output end of the optical power coupling unit with adjustable distribution ratio is an output end of the depolarization module,
    the optical power coupling unit with adjustable distribution ratio consists of an attenuator and an optical coupler which are connected in series, has two input ends and one output end and is configured for coupling two beams of input light into one beam of output light the attenuator is arranged at one optical coupling input end or two attenuators are respectively arranged at two optical coupling input ends; and the attenuators are configured to enable optical power of two laser light beams to be equal before entering the optical coupler,
    a pump light source module and a stimulated Brillouin scattering (SBS) effect generation module, wherein, an output end of the pump light source module is connected to the input end of the depolarization module; two input ends of the SBS effect generation module are respectively connected to the output end of the depolarization module and an external signal light under test; and
    the delay unit in the depolarization module consists of an optical fiber and is configured for enabling two laser light beams to be time-independent, and a minimum value of a length L of the optical fiber satisfies $$\exp\left(-\frac{2\pi\Delta\lambda n}{\lambda^2}L\right) \le 0.01,$$

wherein $\Delta\lambda$ is a line width of the pump light source, n is a refraction index of the optical fiber, and $\lambda$ is a working wavelength of the pump light source; and a maximum value of the length L of the optical fiber satisfies $$\frac{\upsilon L}{c} \le \frac{\Delta}{2},$$

wherein $\upsilon$ represents a scanning speed when the pump light source is in a scanning working state, $\Delta$ represents a resolution of a spectrum measurement device, and c represents a speed of light in the optical fiber.

6. A device for spectral polarization-independent measurement, comprising:
a depolarization module, the depolarization module comprising an optical power distribution unit, a delay unit, a polarization control unit and an optical power coupling unit with adjustable distribution ratio, wherein:
an input end of the optical power distribution unit is an input end of the depolarization module, and two output ends of the optical power distribution unit are respectively connected to input ends of the delay unit and the polarization control unit output ends of the delay unit and the polarization control unit are respectively connected to two input ends of the optical power coupling unit with adjustable distribution ratio; and an output end of the optical power coupling unit with adjustable distribution ratio is an output end of the depolarization module,
the polarization control unit is set to enable a polarization state of an output laser light adjusted by the polarization control unit to be orthogonal with a polarization state of a second beam of laser light, and specifically a following matrix is satisfied:

$(S_{20}, S_{21}, S_{22}, S_{23})^T = (S_{10}, -S_{11}, S_{12}, -S_{13})^T$ wherein, $S_{10}$, $S_{11}$, $S_{12}$ and $S_{13}$ are four Stokes parameters corresponding to the second beam of laser light, $(S_{10}, S_{11}, S_{12}, S_{13})^T$ represents the polarization state of the second beam of laser light, $(S_{20}, S_{21}, S_{22}, S_{23})^T$ represents the polarization state of the beam of laser light adjusted by the polarization control unit, and $S_{20}$, $S_{21}$, $S_{22}$, $S_{23}$ are four Stokes parameters corresponding to the beam of laser light, a pump light source module and a stimulated Brillouin scattering (SBS) effect generation module, wherein, an output end of the pump light source module is connected to the input end of the depolarization module; two input ends of the SBS effect generation module are respectively connected to the output end of the depolarization module and an external signal light under test; and the delay unit in the depolarization module consists of an optical fiber and is configured for enabling two laser light beams to be time-independent, and a minimum value of a length L of the optical fiber satisfies $$\exp\left(-\frac{2\pi\Delta\lambda n}{\lambda^2}L\right) \leq 0.01,$$

wherein $\Delta\lambda$ is a line width of the pump light source, n is a refraction index of the optical fiber, and $\lambda$ is a working wavelength of the pump light source; and a maximum value of the length L of the optical fiber satisfies $$\frac{\upsilon L}{c} \leq \frac{\Delta}{2},$$

wherein $\upsilon$ represents a scanning speed when the pump light source is in a scanning working state, $\Delta$ represents a resolution of a spectrum measurement device, and c represents a speed of light in the optical fiber.

* * * * *